UNITED STATES PATENT OFFICE.

MARK C. RICH, OF BELLEFOURCHE, SOUTH DAKOTA, ASSIGNOR, BY MESNE ASSIGNMENTS, TO THE AMERICAN ALFALFA PRODUCTS CO., OF DENVER, COLORADO, A CORPORATION OF COLORADO.

ALFALFA EXTRACT.

1,195,152. Specification of Letters Patent. Patented Aug. 15, 1916.

No Drawing. Application filed May 15, 1915. Serial No. 28,268.

*To all whom it may concern:*

Be it known that I, MARK C. RICH, a resident of Bellefourche, in the county of Butte and State of South Dakota, have invented certain new and useful Improvements in Alfalfa Extracts, of which the following is a full, clear, and exact description.

The invention relates to alfalfa extract.

In the manufacture of alfalfa products for human consumption, it has been found desirable to produce an extract which is adapted to be used as a flavoring extract in chewing gum, candies, beverages and for other products.

The object of the present invention is to provide alfalfa extract which contains the food values and medicinal properties of alfalfa, which is palatable and which is adapted to be kept in liquid form for consumption as desired.

The invention consists in the extract hereinafter set forth and more particularly defined by claims at the conclusion hereof.

Alfalfa is a lanuginous leaf covered with soft, woolly hair and when it is young the dried secretions cause impurities to adhere to the leaves. In the manufacture of alfalfa extract, according to the present invention, the alfalfa is harvested or cut when it is about 8 to 12 inches high and about 14 days old. In this condition, the alfalfa is free from woody or hard fiber, as compared with its condition when it is from 30 to 35 days old, and from 20 to 24 inches high. The alfalfa is cut about 4 inches above the ground, to leave about 4 inches of stubble. As it is harvested, it is deposited in small bunches of about a bushel each, on the stubble, where it may be left for about 24 hours and during that period the air will circulate through the bunches and the alfalfa leaves will wilt and the stems will be partially dried, so that about half of the inherent moisture in the alfalfa will be removed. This treatment of alfalfa thus harvested sweetens the odor of and partially cures the alfalfa. When the alfalfa has been thus treated, it has been found that impurities are caused to adhere thereto by the secretions and that if these secretions, impurities and the woolly hair on the lanuginous leaves are permited to remain in the product, it will have a rather bitter flavor which renders it unpalatable and will be impure. Next, the alfalfa is gathered and placed in a vat or tank in which it is washed in warm water. In this washing, the alfalfa is agitated or rubbed sufficiently to thoroughly remove the soft woolly hairs on the leaves, the dried secretions and the impurities caused to adhere to the leaves by these secretions. In this washing operation, the impurities settle on the bottom of the vat. After being washed, the alfalfa is rinsed with clean warm water. It has been found in practice that when the alfalfa has been treated thus, the product will have an improved flavor and much of the bitterness and impurities and dried secretions have been eliminated. Next, the alfalfa is placed in loose layers or on racks in a steel constructed drying or curing room and subjected to artificial heat of 150° Fahrenheit from about 3 to 7 days. This treatment prevents bleaching and causes the alfalfa to retain its desirable flavor and to remain light green in color. The period in which the alfalfa is subjected to artificial heat is varied according to the amount of moisture in the alfalfa. Next, the alfalfa is cut or ground into small pieces from $\frac{1}{8}$ to $\frac{1}{2}$ inch in length. The ground alfalfa is then placed in a vacuum pan with about five pounds of water to each pound of ground alfalfa, for example, five pounds of ground alfalfa and twenty-five pounds of water, and boiled for about an hour and a half. Next, the product is passed through a filter press which extracts all the aqueous solution therefrom. This solution is then evaporated until about five pounds of the aqueous solution are left. This solution is then mixed with about one-half to three pounds, according to strength desired, of alcohol, or may use simple syrup with same proportions to prevent fermentation. This compound forms an extract which may be put in bottles or jugs in readiness for use as a flavoring or food extract. It is suitable for flavoring chewing gum, candies, soda fountain beverages and foods for human consumption.

The invention is not to be understood as restricted to the precise practice hereinbefore set forth, since it may be modified within the scope of the appended claims, without departing from the spirit and scope of the invention.

Having thus described the invention, what I claim as new and desire to secure by Letters Patent, is:

1. An alfalfa extract containing an infusion of alfalfa from which the secretions and impurities adhering thereto have been removed.

2. An alfalfa extract containing an infusion of alfalfa from which the woolly hair, secretions and impurities adhering thereto have been removed.

3. An alfalfa extract containing an infusion of alfalfa which is naturally free of woody fiber and from which the secretions and impurities have been removed.

4. An alfalfa extract, containing an infusion of alfalfa which is naturally free of woody fiber and from which the woolly hairs, secretions and impurities have been removed.

5. A concentrated alfalfa extract containing a filtered infusion of alfalfa and alcohol.

6. A concentrated alfalfa extract containing alcohol, a filtered infusion of ground alfalfa which is naturally free from woody fiber.

7. A concentrated alfalfa extract containing a filtered infusion of ground alfalfa which is naturally free from woody fiber and from which the secretions, the impurities adhering thereto and the woolly hairs have been removed.

8. A concentrated alfalfa extract containing alcohol and a filtered infusion of ground alfalfa which is naturally free from woody fiber and from which the secretions, the impurities adhering thereto and the woolly hair have been removed.

MARK C. RICH.

Witnesses:
MILDRED STUMPF,
KATHARINE GERLACH.